United States Patent
Tölli

(10) Patent No.: US 7,454,213 B2
(45) Date of Patent: Nov. 18, 2008

(54) TRAFFIC MANAGEMENT IN RADIO SYSTEM

(75) Inventor: Antti Tölli, Oulu (FI)

(73) Assignee: Nokia Siemens Networks Oy, Espoo (FI)

( * ) Notice: Subject to any disclaimer, the term of this patent is extended or adjusted under 35 U.S.C. 154(b) by 88 days.

(21) Appl. No.: 10/534,131

(22) PCT Filed: Nov. 8, 2002

(86) PCT No.: PCT/FI02/00877

§ 371 (c)(1),
(2), (4) Date: May 6, 2005

(87) PCT Pub. No.: WO2004/043104

PCT Pub. Date: May 21, 2004

(65) Prior Publication Data

US 2006/0014544 A1    Jan. 19, 2006

(51) Int. Cl.
*H04Q 7/20* (2006.01)

(52) U.S. Cl. .................................... 455/453

(58) Field of Classification Search .............. 455/453, 455/525

See application file for complete search history.

(56) References Cited

U.S. PATENT DOCUMENTS 5,497,504 A    3/1996   Acampora et al.
6,363,252 B1   3/2002   Hamalainen et al.

FOREIGN PATENT DOCUMENTS

WO   WO 2004/043104 A1 *  5/2004

OTHER PUBLICATIONS

Tölli, Antti et al. "Performance Evaluation of Common Radio Resource Management (CRRM)"; 2002 IEEE; pp. 3429-3433.
3GPP TS 23.107 V5.4.0 "3rd Generation Partnership Project; Technical Specification Group Services and System Aspects; QoS Concept and Architecture (Release 5)"; Mar. 2003; pp. 1-40.

* cited by examiner

*Primary Examiner*—William D Cumming
(74) *Attorney, Agent, or Firm*—Squire, Sanders & Dempsey, LLP

(57) ABSTRACT

A system and method for traffic management in a radio system monitors at least one cell load parameter of non-real-time users in a radio cell. A cell reselection process is triggered in the radio cell on the basis of a cell load parameter exceeding a pre-set cell load threshold, based on at least one cell load parameter. The non-real-time users perform cell reselection and triggering the selected non-real-time users to perform cell reselection.

24 Claims, 4 Drawing Sheets

TRAFFIC MANAGEMENT IN RADIO SYSTEM

FIELD

The invention relates to a method for traffic management in a radio system, a controller, a radio network controller, a base station and a radio system.

BACKGROUND

The increasing number of users and density of mobile equipment together with the need for transferring large amounts of data further increase the demands set for the capacity and management of wireless communication systems. In the future, there will be more and more users of non-real-time (NRT) services, for example interactive users such as web browsers transfer-ring large amounts of information and users transferring data associated with video and audio signals over wireless communication systems. It has been proposed in connection with evolving new technologies that future wireless communication networks should use several types of radio access technologies instead of just one type of technology, i.e. the use of multisystem networks. Managing quality of service (QoS) in a network without wasting any resources will be one of the important demands. All this causes new demands for traffic management of a radio system.

In order to use multisystem or multicarrier networks efficiently, it is essential to utilise all the systems or carriers efficiently. Efficiency can be improved e.g. by using trunking, a technique by means of which the capacity of several radio channels is automatically distributed between several users. The trunking efficiency of a network can be improved by introducing load balancing mechanisms between systems or carriers.

Until now, the traffic has typically been real-time traffic and the user terminal services have mostly comprised real-time (RT) circuit switched services. In the case of real-time services, multisystem radio traffic management is used to balance RT load and/or interference evenly between cells, thus maximising the trunking efficiency. In multisystem environment, trunking gain can be achieved, for example, by directing an RT user to another system, or to another layer or frequency when the load is heavy thus reducing blocking. When real-time services are concerned, this is typically called handover (HO) but it can also be called network controlled cell reselection (NCCRS). In the future, with the increasing amount of non-real-time (NRT) users there is also a need for balancing the non-real-time load (NRT load).

In prior art the cell load of the radio cells in a radio system has typically been measured by monitoring occupation of physical resources or interference. A problem is that this is not a feasible way to measure NRT load, since the NRT users aim to utilise all the available bandwidth and share it in time-multiplexed manner in order to maximise the experienced data throughput.

Another problem is that different NRT users obtain different shares of the available bandwidth, depending, for example, on the traffic or priority class of the user. Therefore, for example low priority users have less effect on the reduction of the NRT load than high priority users. On the other hand, there may be NRT users using so-called guaranteed services, i.e. services which allow little or no variance in the measured performance criteria, typically services such as video watching. Also, the users belonging to a higher traffic class enjoy certain higher QoS, and therefore, in order to maintain the QoS when the load is heavy, may be preferred to be directed to another system, layer or frequency that is less loaded.

When an RT user is moved to an other system or carrier due to a load reason handover, the reduction of the real-time load is known by the controller responsible for the handover decisions, as the controller is aware of the users bit rate. Thus the controller can easily choose the appropriate number of real-time users to perform traffic reason handovers in order to reduce the load to a desired level.

However, a problem with the non-real-time users is that they do not cause constant traffic in the cell. So, it is difficult to estimate the reduction in the cell load as a result of the cell load balancing actions, especially the inter-system or inter-carrier load balancing actions. A certain number of NRT users may be selected to perform cell reselection to another system or carrier to relieve the cell load caused by the NRT users, but it is difficult to estimate the reduction in the cell load. Therefore, it is also difficult to choose the right number of users to perform cell reselection.

BRIEF DESCRIPTION OF THE INVENTION

It is an object of the invention to provide an improved method for traffic management in a radio system, and a radio system. According to a first aspect of the invention, there is provided a method for traffic management in a radio system, the method comprising: monitoring at least one cell load parameter of non-real-time users in a radio cell; triggering a cell reselection process in the radio cell on the basis of a cell load parameter exceeding a pre-set cell load threshold; selecting, based on at least one cell load parameter, the non-real-time users to perform cell reselection; and triggering the selected non-real-time users to perform cell reselection.

The invention also relates to a radio system, comprising: a base station for providing a radio cell for radio transmission and reception to user equipment; and the radio system is configured to: monitor at least one cell load parameter of non-real-time users in a radio cell; trigger a cell reselection process in the radio cell on the basis of a cell load parameter exceeding a pre-set cell load threshold, select, based on at least one cell load parameter, the non-real-time users to perform cell reselection; trigger the selected non-real-time users to perform cell reselection.

The invention further relates to a controller of a radio system comprising a base station for providing a radio cell for radio transmission and reception to user equipment, the controller comprising: monitoring means for monitoring at least one cell load parameter of non-real-time users in a radio cell; first triggering means for triggering a cell reselection process in the radio cell (226) on the basis of a cell load parameter exceeding a pre-set cell load threshold; selecting means for selecting, based on at least one non-real-time cell load parameter, the non-real-time users to perform cell reselection; and second triggering means for triggering the selected non-real-time users to perform cell reselection.

The invention further relates to radio network controller of a radio system comprising a base station for providing a radio cell for radio transmission and reception to user equipment, the radio network controller comprising: monitoring means for monitoring at least one cell load parameter of non-real-time users in a radio cell; first triggering means for triggering a cell reselection process in the radio cell on the basis of a cell load parameter exceeding a pre-set cell load threshold; selecting means for selecting, based on at least one non-real-time cell load parameter, the non-real-time users to perform cell reselection; and second triggering means for triggering the selected non-real-time users to perform cell reselection.

The invention further relates to a base station of a radio system, the base station for providing a radio cell for radio transmission and reception to user equipment, the base station comprising: monitoring means for monitoring at least one cell load parameter of non-real-time users in a radio cell; first triggering means for triggering a cell reselection process in the radio cell on the basis of a cell load parameter exceeding a pre-set cell load threshold; selecting means for selecting, based on at least one non-real-time cell load parameter, the non-real-time users to perform cell reselection; and second triggering means for triggering the selected non-real-time users to perform cell reselection.

Preferred embodiments of the invention are described in the dependent claims.

The method, system, controller radio network controller and a base station of the invention provide several advantages. The nature of the packet switched traffic of the NRT users is typically bursty and the packets are delayed in the buffers of the radio network controllers. Hence, in the case of NRT traffic the multisystem radio traffic management aims to maximise the data throughput and minimise the delay experienced by the user. In the embodiments of the invention, instead of measuring physical load, parameters that better describe the cell load caused by the NRT users are used for measuring, for example the delay per NRT user or data throughput of an NRT user.

An advantage of an embodiment of the invention is that it introduces a way to select the best candidates among the NRT users for cell reselection, thus allowing the best possible reduction of the NRT load with as little effect on the QoS of the users as possible.

Another advantage of an embodiment of the invention is that it enables to select the right number of NRT users for cell reselection allowing the best possible reduction of the NRT load. Moreover, it is possible to avoid a situation where all the NRT users make the cell reselection to another cell or cells and in turn trigger load balancing actions in the new cell and also avoid the unnecessary signalling caused.

In an embodiment of the invention an extra advantage is gained by selecting separately the NRT users of different traffic or priority classes for cell reselection, thus enabling a greater reduction of the NRT load.

LIST OF DRAWINGS

In the following, the invention will be described in greater detail with reference to the preferred embodiments and the accompanying drawings, in which FIG. 1 shows an example of a radio system;

DESCRIPTION OF THE EMBODIMENTS

Figure 1:
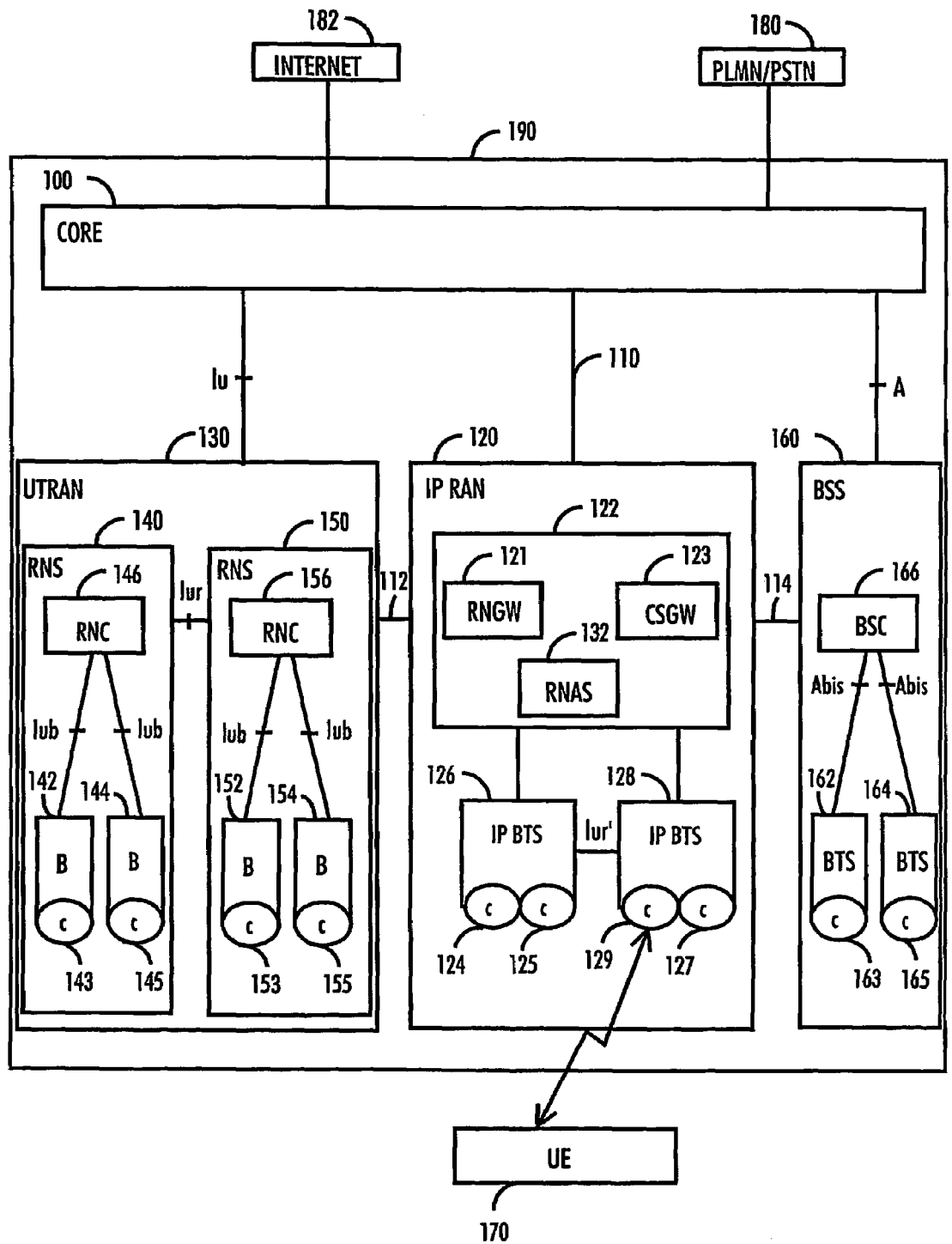

With reference to FIG. 1, a radio system is described as an example of a system, to which the embodiments of the invention can be applied. FIG. 1 is a simplified block diagram, which illustrates the main parts of a radio system at network element level. The structure and the functions of the network elements are only described when relevant to the invention.

The invention can be applied in a radio system comprising more than one radio access networks, which the user equipment can be in connection with, i.e. multisystem network. FIG. 1 shows the general architecture of a radio system using different radio access technologies and the interoperation of different generations of radio access networks, where network elements from the second, 2.5 and third generations coexist. The technologies that can be used comprise: GSM (Global System for Mobile Communications) and GE-RAN (GSM/EDGE Radio access network), GPRS (General Packet Radio Service), and E-GPRS (EDGE GPRS), UMTS (Universal Mobile Telecommunications System), WCDMA (Wideband Code Division Multiple Access) or CDMA2000 (Code Division Multiple Access), Internet protocol (IP) based technologies and WLAN (Wireless Local Area Network), technologies that are already in use worldwide or under constant development. Below, embodiments will be shown using mainly the GSM, UMTS and IP RAN based techniques as examples, without limiting the invention to these systems, as will be obvious to a person skilled in the art.

The main parts of a radio system comprise a core network (CN) 100, a radio access network 120, 130, 160 and user equipment (UE) 170. FIG. 1 illustrates a radio access network (RAN) called UTRAN (UMTS Terrestrial Radio Access Network) 130 belonging to the third generation and implemented by WCDMA-technology. FIG. 1 also shows a base station subsystem (BSS) 160 belonging to the second generation and implemented by time division multiple access (TDMA) technology, and an Internet Protocol Radio Access System 120 (IP RAN) implemented with WCDMA technology.

On a general level, the radio system can also be defined to comprise user equipment 170 and a network part 190. The user equipment 170 can also be called a terminal, a mobile station, a subscriber terminal or a mobile telephone. The network part 190 comprises the fixed infrastructure of the radio system, i.e. the core network 100, the UMTS radio access network 130, the base station subsystem 160, and the IP RAN 120. In this context, the UMTS radio access network 130, the base station subsystem 160, the Internet protocol radio access system 120, and related systems will be called a radio access network (RAN).

In FIG. 1, the core network (CN) 100 represents the radio-independent layer of the radio system. The core network 100 comprises network elements for establishing both circuit-switched connections and packet-switched connections. The network elements of the core network 100 are responsible for tasks such as switching, paging, user equipment location registration, and handover management. The core network 100 is responsible for routing incoming traffic and traffic from the core network 100 to external networks 180, 182.

The core network 100 of the radio system is connected to the external networks 180, 182. The external networks 180, 182 are represented by a public land mobile network PLMN 180 or a public switched telephone network PSTN 180, and the Internet 182.

The Base Station Subsystem (BSS) 160 based on the GSM comprises a base station controller (BSC) 166 and base transceiver stations (BTS) 162, 164. The base station controller 166 controls the base transceiver stations 162, 164. The interface 106 between the core network 100 and the BSS 160 is called an A interface. The interface between the BSC 166 and BTS 162, 164 is called an A-bis interface. In principle, the devices implementing the radio path and their functions should be located in the base transceiver station 162, 164 and the management devices in the base station controller 166.

The implementation may naturally deviate from this principle. As is known to a person skilled in the art, a radio system can comprise several base station subsystems 160 not described in FIG. 1 for the sake of clarity.

The UMTS Radio Access Network (UTRAN) 130 comprises radio network subsystems (RNS) 140, 150. Each radio network subsystem 140, 150 comprises radio network controllers (RNC) 146, 156 and nodes B 142, 144, 152, 154. Node B is a rather abstract concept, and is thus frequently replaced by the term 'base station'. Solutions where the same device functions both as the base station and as the node B are also available, i.e. the device can simultaneously implement a TDMA and a WCDMA radio interface.

The radio system may also use an IP technology based radio access network, i.e. an IP RAN (Internet Protocol Radio Access Network) 120. FIG. 1 shows the IP RAN 120 as an example of a radio access network (RAN) to which the embodiments can be applied. Since the IP technology based radio access networks and their architecture are being continuously developed, the IP RAN 120 of FIG. 1 shows an examplanary architecture describing some of the main functionalities of such an IP technology based RAN, and the implementations may vary. The IP RAN 120 described in FIG. 1 is a radio access network platform based on IP-technology that also enables interoperation with other, more conventional radio network access technologies and networks, such as the UTRAN (UMTS Radio Access Network), BSS (Base Station Subsystem) used in GSM (Global System for Mobile Communications) or GERAN (GSM EDGE Radio Access Network). The IP RAN is connected to the UTRAN 130 with an interface 112, to the BSS 160 with an interface 114 and to the core network 100 with an interface 110.

The IP RAN 120 can be described briefly with the following groups of entities described in FIG. 1: the IP base stations (IP BTS) 126, 128, and the IP RAN gateways 122, such as for example a radio access network gateway (RAN Gateway, RNGW) 121, and a circuit switched gateway (CS gateway, CSGW) 123 for the circuit switched traffic. The IP RAN gateways 122 can also comprise other elements, such as a RAN access server (RNAS) 132 for controlling access to the network, and other elements, such as servers and routers, not described in FIG. 1.

In the IP RAN 120 most of the functions of the centralized controller (RNC 146 and BSC 166) are planned to be moved to the IP base station 126. In particular, all the radio protocols are to be moved to the IP base station 126. Entities outside the IP base station 126 are needed for example to perform configuration and radio resource (RR) functions, or for interworking with conventional radio access networks or base station subsystems or gateways to the core network 100. However, in more evolutionary architectures RNC or BSC may still be used.

FIG. 1 also illustrates the coverage areas, i.e. cells, of the base stations of the different radio access networks. Cells 143, 145, 153, 155 thus represent the coverage areas of the nodes B 142, 144, 152, 154, and cells 163, 165 represent the coverage areas of the base stations 162, 164. One node B 142, 144, 152, 154 or base station 162, 164 may either serve one cell, as illustrated in FIG. 1, or several cells, which in the case of base stations can be sectored cells. An IP base station may also serve several cells. In the figure the coverage area of the IP base station (IP BTS) 126 is represented by cells 124, 125, and the coverage are of the IP BTS 128 is represented by cells 127, 129.

The user equipment (UE) 170 illustrated in FIG. 1 is preferably applicable both to 2G and 3G systems, comprising at least one transceiver for establishing a radio connection to the radio access network 120. Typically, the user equipment 170 is a mobile station (MS), further comprising an antenna, a user interface and a battery. The user equipment 170 can also have properties similar to those of a personal computer or a portable computer. The user equipment 170 is connected to the radio system via the base stations of a radio access network, such as the IP RAN 120, for providing the user of the UE 170 with access to the core network of the radio system using a telecommunications connection. The telecommunications connection comprises a radio connection with a base station and a connection between the base station and the core network.

Figure 2:
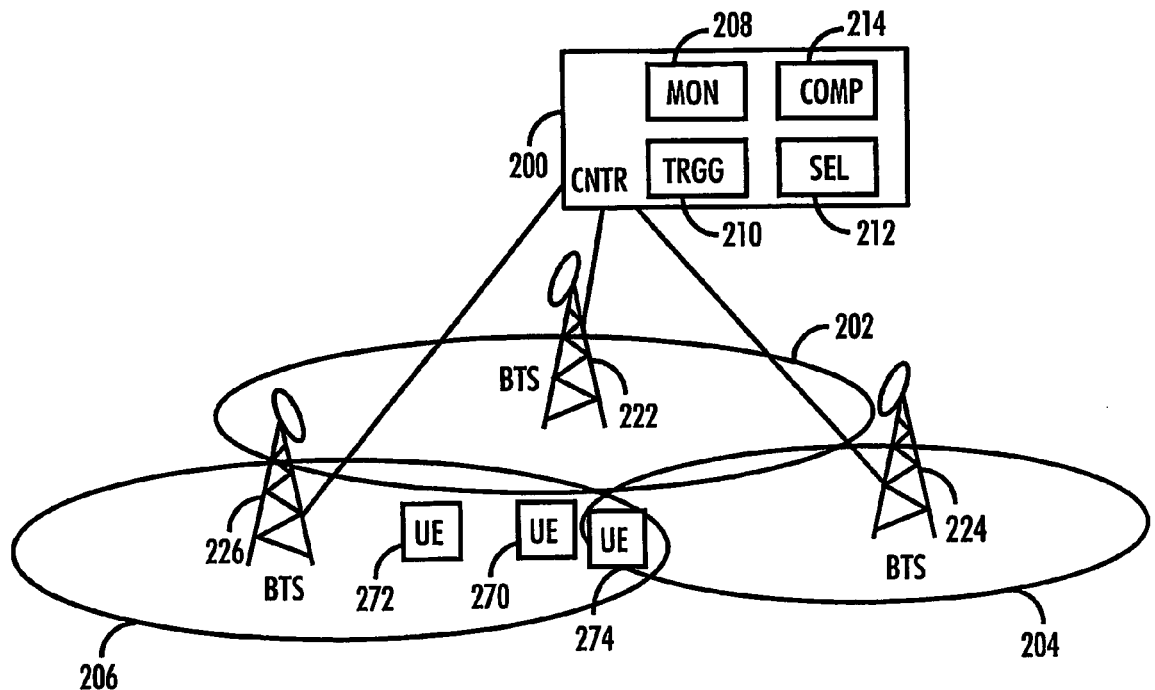
FIG. 2 illustrates an example of a radio system utilising traffic management.

FIG. 2 illustrates a manner how traffic management is used in a radio system. The embodiment is described in a simplified, generic radio system, and in a situation where network controlled cell reselections take place between different cells of the same system, i.e. inter carrier cell reselections take place. The radio system comprises a controller 200 handling the control functions of the radio access network. The controller 200 may be an RNC 146 in the case of UTRAN 130, i.e. in WCDMA based systems, or in the case of BSS 160, i.e. in a GSM/GPRS based system a BSC 166. The controller 200 may also be an IP BTS 124 handling the control functions of the IP RAN 120. The controller 200 may also be any other controller responsible for cell reselection, for example a controller in a WLAN system. The controller 200 monitors at least one cell load parameter reflecting the NRT cell load caused by non-real-time users of a radio cell 206, which are represented by user equipment 270, 272, 274. The monitoring can take place for example by measuring PDCP/RLC (packet data convergence protocol/ radio link control) buffer delay in the controller 200. The controller 200 also receives information, e.g. measurement reports on for example the transmission power level, from the cells 202, 204, 206, in practice from the base stations 222, 224, 226 of the radio system. Based on information from the controller 200 itself and received from the base stations 222, 224, 226, the controller monitors the NRT cell load of the radio cells 202, 204, 206.

The monitoring and the parameter can for example be based on the buffer delay of each buffer or queue in the buffer, or on the averaged value of all the buffers in the controller 200, or for example on the average experienced delay of the NRT users. Besides based on the delay, the parameter and the monitoring can be based on for example the achieved data throughput or the average data throughput of the NRT users or the capacity request rejection rate in WCDMA-based systems. Alternatively, the monitoring and the parameter can be based on measuring the number of reserved TBFs (temporary block flow) compared to the total number of TBFs or number of TBF users in GSM or GPRS-based systems. A TBF is a temporary GPRS connection block flow, i.e. a physical connection where multiple mobile stations (MS) share one traffic channel, but the traffic channel is dedicated to one MS at a time, meaning that one MS is transmitting or receiving at a time.

In the embodiment, the controller 200 compares the monitored parameter with a pre-set cell load threshold. When the monitored parameter exceeds the threshold, the controller 200 triggers a cell reselection process in the radio cell 206.

When the cell reselection process has been triggered in the radio cell 206 the controller 200 selects the NRT users to perform cell reselection based on at least one cell load parameter.

In an embodiment, in order to select the best candidates for cell reselection, the controller 200 may prior to the selecting, rank non-real-time users based on a cell load parameter or a traffic class or a priority class of the NRT user. The controller 200 then selects the non-real-time users to be triggered to perform cell reselection based on the ranking. Typically the controller 200 forms a cell reselection list of the ranked NRT users and then selects the NRT users to perform cell reselection starting from the top of the list. The ranking can alternatively be performed in advance, before triggering the cell reselection process.

In an embodiment the number of non-real-time users to perform cell reselection is selected based on the non-real-time cell load parameter.

In an embodiment the number of NRT users selected for cell reselection can be selected based on the magnitude by which the pre-set cell load threshold is exceeded, i.e. the number of NRT users selected for cell reselection may be in proportion to the increase in the value of the cell load parameter, for example the excess buffer delay.

As mentioned earlier, the NRT users can also be selected or ranked based on, for example, the traffic class (e.g. interactive, background) or priority class (traffic handling priority (TPH), e.g. THP(1-16) or allocation/ketention priority (ARP) e.g. ARP(1-3)). For example, if the NRT users belonging to a higher traffic or priority class make up the majority of the NRT users of the cell, they may be placed higher on the cell reselection list, since moving the low priority or traffic class users to another cell does not necessarily decrease the cell load enough. On the other hand, it may not be feasible to move higher priority NRT users to another cell in order to give better service for lower priority users. Selecting the NRT users for cell reselection can, for example, also be based on the priority class of the NRT user, which cell load parameter exceeds a pre-set cell load threshold. For instance, if the cell load of a low priority NRT user exceeds a cell load threshold, the NRT users to perform cell reselection can be selected among the NRT users belonging to the low priority class in question. On the other hand, another option is to select the NRT users among all priority classes depending on the amounts of NRT users of each priority class in the cell.

The traffic classes that also can be called quality of service classes (QoS class) measure the quality of service (QoS). The UMTS specifications (3GPP TS 23.107 V5.4.0 (2002-03)) define four QoS classes: conversational class, streaming class, interactive class, and background class. The main difference between the traffic classes lies in the sensitivity of the traffic they are meant for: the traffic in the conversational class is very delay sensitive and the traffic in the background class is least sensitive for delay. The priority classes are used in a packet scheduler to categorise different types of packet users, such as the interactive and background users. The priority classes are used when the packet scheduler shares the available air interface capacity between different packet users. The packet scheduler is typically physically located in the RNC 146. In the case of IP RAN 120 packet scheduler may be implemented in the IP BTS 126, 128.

The NRT users may also be selected or ranked based on, for example, the quality of service (QoS), delay, data throughput or error ratio the NRT user is experiencing.

The ranking may also be based on the transmission power level, i.e. the NRT users having the highest TX power, in other words the users being close to the cell edge, are placed first on the cell reselection list.

Depending on the implementation of the radio system, the packet scheduler may be implemented with a single buffer or different buffers for different traffic classes or priority classes. As the high priority users are allowed on average more bandwidth than low priority users, the low priority users have less effect on the reduction of the buffer delay or on the increasing of the average user data throughput. Therefore an extra advantage is gained by selecting separately the NRT users of different traffic or priority classes for cell reselection. This can be done by ranking the NRT users firstly based on traffic or priority classes and secondly ranking the NRT users belonging to a certain class based on an NRT cell load parameter, e.g. the experienced delay. Thus different pre-set thresholds may be used for different traffic classes or priority classes. For example, if the delay in some of the buffers exceeds the pre-set delay threshold for a given traffic class, a number of users within that specific traffic class is selected for performing cell reselection. In the embodiment the NRT users to be triggered to perform cell reselection are then after the ranking selected among the ranked NRT users.

Alternatively, the NRT users can be selected among all the NRT users and among all the traffic or priority classes based on a cell load parameter exceeding a pre-set threshold, e.g. the experienced delay.

When the cell reselection process is triggered in the cell 206, for example for NRT users 270, 272 belonging to a certain priority class, e.g. THP(1) service priority class, a group of NRT users 270, 272 belonging to the priority class is selected among all NRT users 270, 272, 274 and ranked based on a NRT cell load parameter by the controller 200.

Based on the ranking the controller 200 typically forms a list of the ranked NRT users and then selects an appropriate number of users within the priority class for cell reselection, starting from the top of the list.

Finally the controller 200 triggers the selected users to perform the cell reselection.

The controller 200 described in FIG. 2 typically further comprises monitoring means 208 for monitoring at least one cell load parameter of non-real-time users in a radio cell, triggering means 210 for triggering a cell reselection process, selecting means 212 for selecting the non-real-time users to perform cell reselection, and triggering means 210 for triggering the selected non-real-time users to perform cell reselection. The triggering means 210 for triggering the cell reselection process and the triggering means 210 for triggering the selected non-real-time users to perform cell reselection may be implemented separately, or as in FIG. 2 they may be implemented in a common entity, i.e. like the triggering means 210 configured to trigger both the cell reselection process and the selected non-real-time users to perform cell reselection. The controller 200 may also comprise comparing means 214 for comparing the NRT cell load information with a pre-set load threshold and ranking means 216 for ranking end users for cell reselection.

The monitoring means 208, triggering means 210, selecting means 212, comparing means 214 and ranking means 216 may also be implemented separately in different controllers or in some other physical entity having a connection with the controller 200.

The disclosed functionalities can be implemented in different parts of the radio system by means of software, usually as a processor and its software, but various hardware solutions are also feasible, e.g. a circuit built from logic components or one or more application specific integrated circuits ASIC. A hybrid of these different implementations is also feasible. When selecting the implementation method, a person skilled in the art will consider the requirements set on the size and power consumption of the device, the necessary processing capacity, the production costs and the production volumes.

Figure 3:
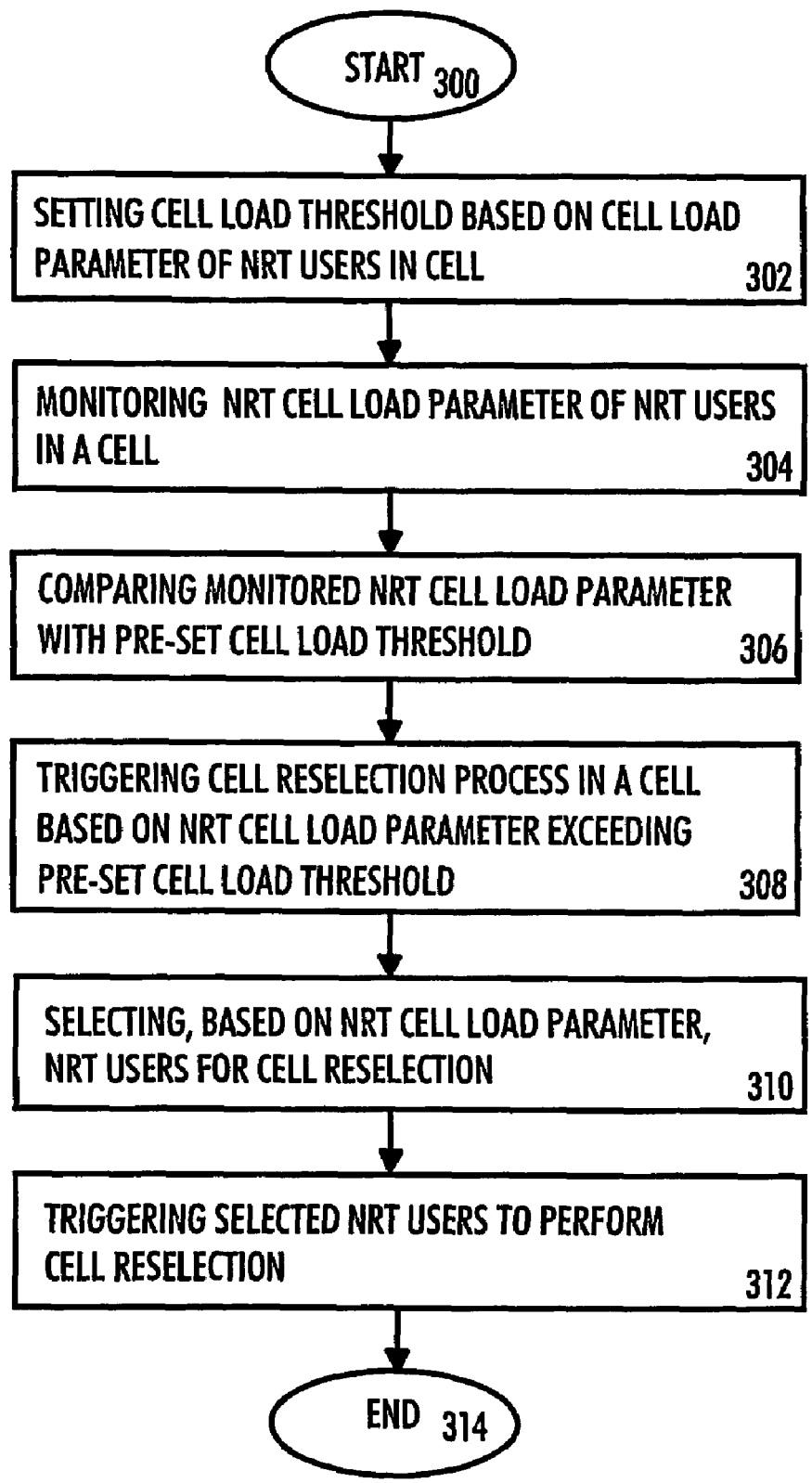
FIG. 3 is a flow chart illustrating a method for traffic management in a radio system

Next, referring to the simplified block diagram of FIG. 3, a method according to an embodiment is explained. It should be noted, that all featured blocks are not necessarily needed in every embodiment and that the order in which the blocks are performed may vary.

The method starts in 300. In 302, at least one cell load threshold is set based on at least one cell load parameter of non-real-time users in a cell for triggering a cell reselection process. In 304 at least one cell load parameter of the non-real-time users in a radio cell is monitored. In 306 the monitored parameter is compared with a pre-set cell load threshold. In 308 a cell reselection process is triggered in the radio cell based on the fact that a monitored cell load parameter exceeds a pre-set cell load threshold. In 310, the non-real-time users to perform cell reselection are selected based on at least one cell load parameter. In 312, the selected non-real-time users are triggered to perform cell reselection. The method ends in 314.

Due to the nature of the packet traffic, it is not possible to know the exact reduction in the NRT load, for example in the buffer delay, when an NRT user is moved to another cell, i.e. to another system and/or carrier. Therefore, it is difficult to choose exactly the right number of NRT users that should be triggered to perform cell reselection. The reduction can be too large or too small, as the amount of the traffic caused by a single NRT user is not known in advance. The problem can be eased, if the reduction is too small, by triggering more users for cell reselection next time the cell reselection process is triggered in the cell.

In an embodiment, the number of NRT users to perform cell reselection is selected based on the cell load parameter. Let us now examine a manner of selecting the number of NRT users for cell reselection using an example, where it is assumed that the number of active packet data users, i.e. NRT users, is X, the previously set threshold for the buffer delay is Y seconds, and the actual buffer delay is Z seconds. Thus, when Z is greater than Y, the excess delay compared to the delay threshold is the actual delay Z divided by the delay threshold Y, i.e. Z/Y. From this it is possible to calculate the number of NRT users that need to be triggered to make cell reselection, using formula (1):

$$(1-Y/Z)*X \qquad (1),$$

i.e. the number of NRT users multiplied with the subtraction of factor one and the delay threshold divided with the actual delay. Thus, the number of NRT users to be triggered for cell reselection is in relation with the actual delay. An additional factor, for example integer one, can be used in the calculation to guarantee that the delay is reduced below the threshold level.

To further clarify the described way of selecting the number of NRT users let us examine an example that comprises 25 active NRT users with a certain priority class in the cell, and delay is used as the NRT cell load parameter to be monitored by the controller 200. The pre-set cell load threshold, in this case the delay threshold for the priority class, is set to 5 seconds. The measured actual buffer delay for the priority class in question is 7 seconds. A delay reason network controlled cell reselection (NCCR) is triggered in the cell based on the NRT cell load parameter exceeding the pre-set cell load threshold. Based on the exemplary method for calculating the number of the NRT users selected for cell reselection, the number of NRT users to be selected is: (1-5/7)*25=7, 14, i.e. 8 NRT users are selected for cell reselection.

Figure 4:
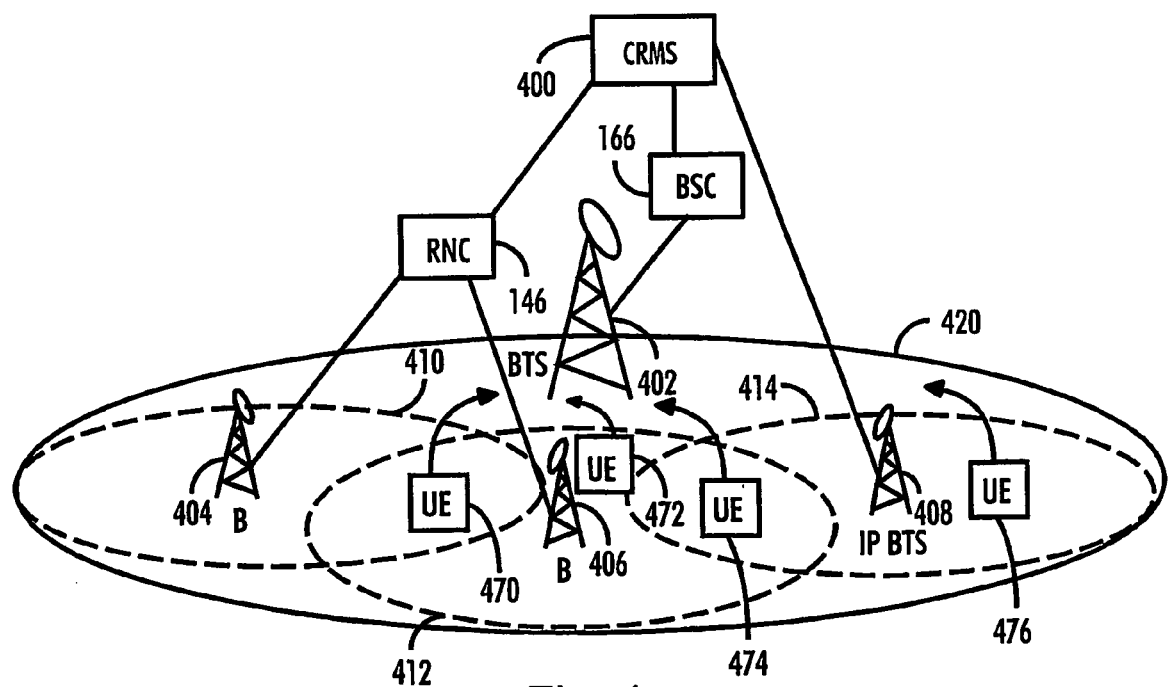
FIG. 4 illustrates another radio system utilising traffic management.

Referring to FIG. 4, let us examine another example of a radio system utilising the described way of traffic management. FIG. 4 describes a situation where network controlled cell reselections take place between different systems and/or cells of the same system, i.e. inter system and inter carrier cell reselections take place. FIG. 4 describes a multisystem network, more specifically an overlay-underlay network. In this example the overlay network is a GSM network and the underlaying networks comprise a WCDMA network and a network using IP based RAN. The overlay network comprises GSM base station 402 and a cell 420 and the underlay networks comprise nodes B 404, 406 and cells 410, 412 and IP BTS 408 and cell 414. FIG. 4 also illustrates user equipment 470, 472, 474, 476.

The user equipment 470, 472, 474 are under the coverage of the cell 412. The controller 146, in this case the RNC 146 monitors at least one NRT cell load parameter of the user equipment 470, 472, 474. The RNC 146 notices that a parameter exceeds a pre-set threshold and triggers the cell reselection process in the cell 412 and selects the NRT users to perform cell reselection. The RNC 146 then triggers the selected NRT users to perform cell reselection, for example to the cell 420.

As described in FIG. 4, the radio system may also comprise a radio resource manager 400 connected to the radio network for implementing the control function of all radio related control and for managing the radio resources between the base stations and the user equipment in the radio network. The radio resource manager 400 is typically configured to receive radio capacity information, which can be indicated as the cell load of the radio cell. The radio resource manager 400 can be used to transmit measured NRT load information between the different controllers 146, 166 and the IP BTS 408. Also the decisions on a network controlled cell reselection can be done using the radio resource manager 400. The radio resource manager 400 can for example be implemented by an entity called a common resource management server (CRMS), an entity that belongs to the RAN common servers 122 (described in FIG. 1). However, the implementation of the embodiment is not restricted to the CRMS but the radio resource manager 400 could be any entity configured to control the radio resources of the radio system.

Figure 5:
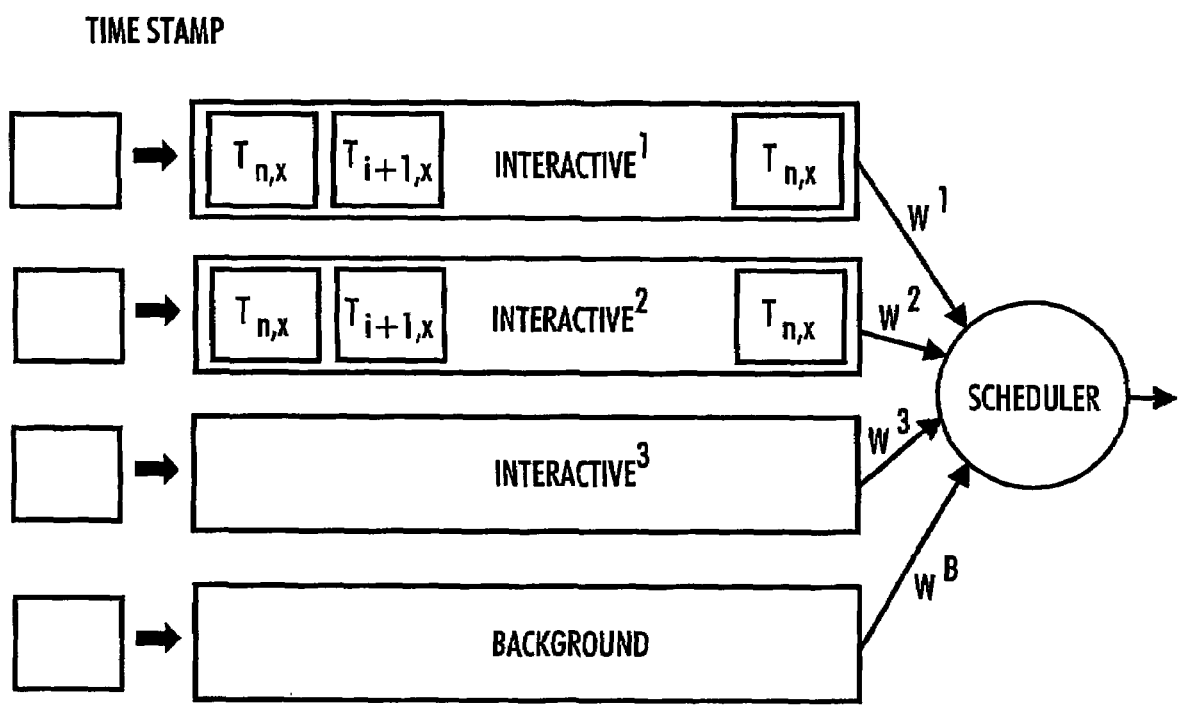
FIG. 5 illustrates an example of a manner for estimating NRT delay in cell buffers.

With reference to FIG. 5 an embodiment introducing a manner for estimating NRT delay in cell buffers is described. In the example of FIG. 5 the buffers for three interactive user traffic classes with different priorities (1, 2, 3) and for a background traffic class are illustrated. Each buffer has a weight w, which is used in a weighted round-robin algorithm in the BTS. Each RLC block (Radio Link Control) is marked with a time stamp ($T_{n,x}$) as the buffer time starts. Correspondingly a buffer delay ($D_x$) for each data packet is collected at the time when the packet is first scheduled from the buffer. The time stamp for a packet is (2):

$$T_{m,x}=T_{i,x}+D_x \qquad (2),$$

and the buffer delay for a buffer, e.g. for buffer 1 is (3):

$$D^1=a*D_{old}+(1-a)*D_x \qquad (3).$$

So the total buffer delay ($D^{tot}$) is calculated using formula (4):

$$D^{tot}=w^1*D^1+w^2*D^2+w^3*D^3+W^B*D^B \qquad (4).$$

Individual packet delays are then led through an IIR-filter (Infinite Impulse Response), which performs weighted averaging between an old stored delay value and a new delay sample. The filtering process using IIR or AR (Auto Regressive) model can be described using the following formula (5):

$$D^{buff}=a*D_{old}{}^{buff}+(1-a)*D_{new}{}^{buff} \qquad (5),$$

where:
$D^{buff}$ is the buffer delay for a certain buffer
a is the forgetting factor, 0<a<1, $D_{old}^{buff}$ is the previous filtered delay data,
$D_{new}^{buff}$ is the new delay value measured for the given packet, A typical value for the forgetting factor a, is for example about 0.95-0.98. The higher the value of the forgetting factor a is, the longer it takes the filtering to be performed. If the value is too high, the statistics are not able to respond to changes in the buffer delay.

The distinct delay value of each buffer or queue can be used to trigger a delay reason cell reselection. The filtered delay statistics of each of the four buffers in the example can also be averaged according to their corresponding round-robin weights. A similar method can be used to calculate a weighted average of the average user throughput, or any other NRT cell load parameter, which are then used to trigger cell reselection.

Even though the invention is described above with reference to an example according to the accompanying drawings, it is clear that the invention is not restricted thereto but it can be modified in several ways within the scope of the appended claims.

The invention claimed is:

1. A method for traffic management in a radio system, the method comprising:
   monitoring at least one cell load parameter of non-real-time users in a radio cell;
   triggering a cell reselection process in the radio cell on the basis of a cell load parameter exceeding a pre-set cell load threshold;
   selecting, based on at least one cell load parameter, the non-real-time users to perform cell reselection; and
   triggering the selected non-real-time users to perform cell reselection.

2. The method of claim 1, further comprising selecting, based on the cell load parameter, the number of non-real-time users to perform cell reselection.

3. The method of claim 1, further comprising using different pre-set cell load thresholds for different traffic classes or priority classes of the non-real-time users.

4. The method of claim 1, wherein non-real time users are selected for cell reselection on the basis of at least one of the following cell load parameters:
   experienced quality of service;
   experienced delay;
   data throughput;
   transmission power level;
   capacity request rejection rate;
   used temporary block flows;
   number of temporary block flow users.

5. The method of claim 1, further comprising ranking the non-real-time users on the basis of a cell load parameter, and
   selecting the non-real-time users to perform cell reselection on the basis of a ranking.

6. The method of claim 1, wherein the number of non-real-time users to perform cell reselection is based on the magnitude by which the pre-set cell load threshold is exceeded.

7. The method of claim 1, wherein the cell reselection is an inter-system cell reselection or an inter-carrier cell reselection.

8. A radio system comprising:
   a base station configured to provide a radio cell for radio transmission and reception to user equipment, wherein the base station comprises:
   monitor unit configured to monitor at least one cell load parameter of non-real-time users in a radio cell;
   a triggering unit configured to trigger a cell reselection process in the radio cell on the basis of a cell load parameter exceeding a pre-set cell load threshold,
   selecting unit configured to select, based on at least one cell load parameter, the non-real-time users to perform cell reselection; and
   wherein the triggering unit is further configured to trigger the selected non-real-time users to perform cell reselection.

9. The system of claim 8, wherein the base station is configured to select, based on the cell load parameter, the number of non-real-time users to perform cell reselection.

10. The system of claim 8, wherein the base station is configured to use different pre-set cell load thresholds for different traffic classes or priority classes of the non-real-time users.

11. The system of claim 8, wherein the base station is configured to select, based on at least one of the following cell load parameters, non-real-time users for cell reselection:
    experienced quality of service;
    experienced delay;
    data throughput;
    transmission power level
    capacity request rejection rate;
    used temporary block flows;
    number of temporary block flow users.

12. The system of claim 8, wherein the base station is configured to rank the non-real-time users on the basis of a cell load parameter, and that the selection of the non-real-time users to perform cell reselection is based on the ranking.

13. The system of claim 8, wherein the base station is configured to select, based on the magnitude by which the pre-set cell load threshold is exceeded, the number of non-real-time users to perform cell reselection.

14. The system of claim 8, wherein the base station is configured to trigger an inter-system cell reselection or an inter-carrier cell reselection.

15. The system of claim 8, wherein the base station comprises a controller configured to:
    monitor at least one cell load parameter of non-real-time users in a radio cell;
    trigger a cell reselection process in the radio cell on the basis of a cell load parameter exceeding a pre-set cell load threshold;
    select, based on at least one non-real-time cell load parameter, the non-real-time users to perform cell reselection; and
    trigger the selected non-real-time users to perform cell reselection.

16. A controller of a radio system, the controller comprising:
    monitoring unit configured to monitor at least one cell load parameter of non-real-time users in a radio cell;
    a triggering unit configured to trigger a cell reselection process in the radio cell on the basis of a cell load parameter exceeding a pre-set cell load threshold;
    selecting unit configured to select, based on at least one non-real-time cell load parameter, the non-real-time users to perform cell reselection; and
    wherein the triggering unit is further configured to trigger the selected non-real-time users to perform cell reselection,
    wherein the controller is operable in a radio system comprising a base station, and the base station is configured to provide a radio cell for radio transmission and reception to user equipment.

17. The controller of claim 16, wherein the selecting unit is configured to select, based on the cell load parameter, the number of non-real-time users to perform cell reselection.

18. The controller of claim 16, wherein the triggering unit is configured to use different pre-set cell load thresholds for different traffic classes or priority classes of the non-real-time users.

19. The controller of claim 16, wherein the selecting unit is configured to select, based on at least one of the following cell load parameters, non-real-time users for cell reselection:
   experienced quality of service;
   experienced delay;
   data throughput;
   transmission power level
   capacity request rejection rate;
   used temporary block flows;
   number of temporary block flow users.

20. The controller of claim 16, wherein the selecting unit is configured to rank the non-real-time users on the basis of a cell load parameter and to select the non-real-time users on the basis of a ranking.

21. The controller of claim 16, wherein the selecting unit is configured to select, based on the magnitude by which the pre-set cell load threshold is exceeded, the number of non-real-time users to perform cell reselection.

22. The controller of claim 16, wherein the triggering unit is configured to trigger an inter-system cell reselection or an inter-carrier cell reselection.

23. A radio network controller of a radio system, the radio network controller comprising:
   monitoring means for monitoring at least one cell load parameter of non-real-time users in a radio cell;
   first triggering means for triggering a cell reselection process in the radio cell on the basis of a cell load parameter exceeding a pre-set cell load threshold;
   selecting means for selecting, based on at least one non-real-time cell load parameter, the non-real-time users to perform cell reselection; and
   second triggering means for triggering the selected non-real-time users to perform cell reselection,
   wherein the radio network controller is operable in a radio system comprising a base station and the base station provides a radio cell for radio transmission and reception to user equipment.

24. A base station of a radio system, comprising:
   monitoring means for monitoring at least one cell load parameter of non-real-time users in a radio cell;
   first triggering means for triggering a cell reselection process in the radio cell on the basis of a cell load parameter exceeding a pre-set cell load threshold;
   selecting means for selecting, based on at least one non-real-time cell load parameter, the non-real-time users to perform cell reselection; and
   second triggering means for triggering the selected non-real-time users to perform cell reselection.

* * * * *